March 9, 1948. O. DENYS 2,437,594
DISTILLATION FROM A FILM BY DIFFUSION INTO A GAS STREAM
Filed Oct. 10, 1944 2 Sheets—Sheet 2
FIG. 2.
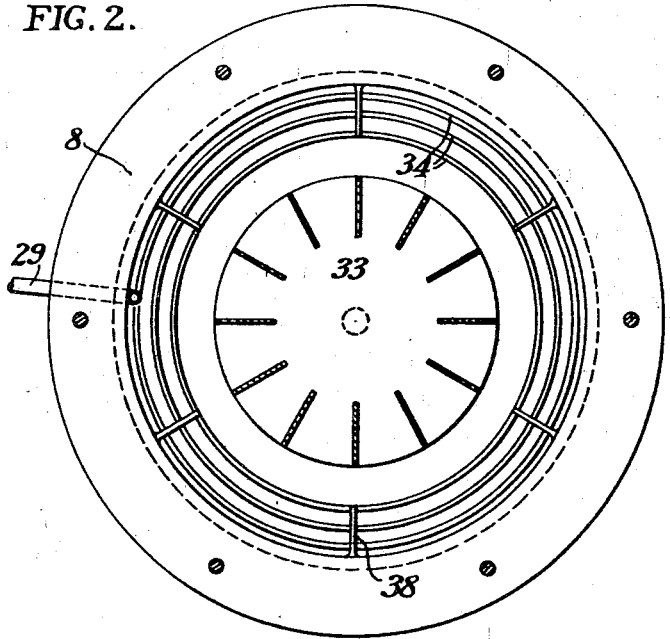
FIG. 5.
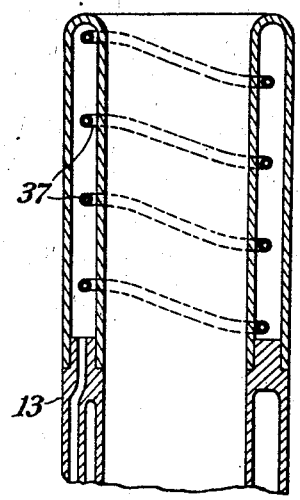
FIG. 3.
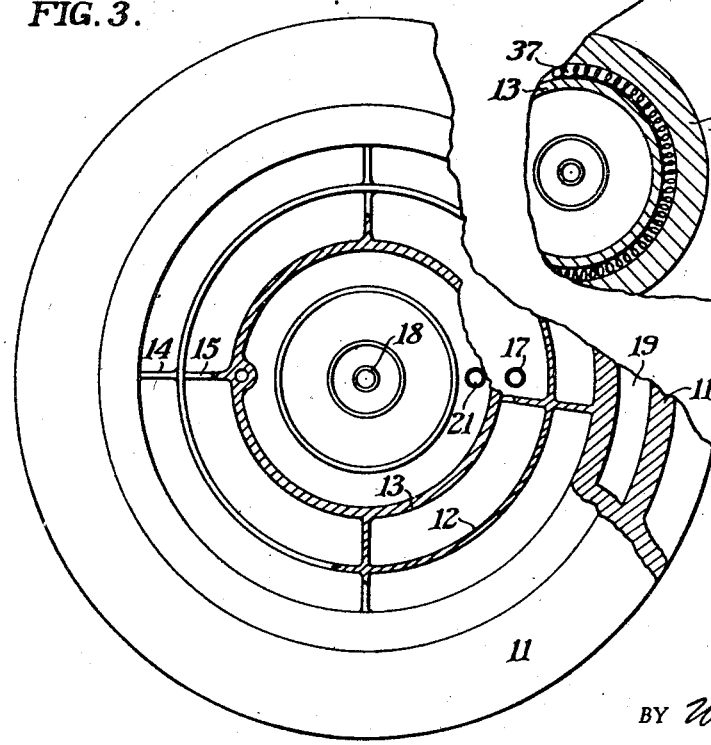
FIG. 4.
ORBAN DENYS
INVENTOR
BY W. H. Cannon
ATTORNEY Patented Mar. 9, 1948

2,437,594

UNITED STATES PATENT OFFICE 2,437,594

DISTILLATION FROM A FILM BY DIFFUSION INTO A GAS STREAM

Orban Denys, Brooklyn, N. Y., assignor to Distillation Products, Inc., Rochester, N. Y., a corporation of Delaware Application October 10, 1944, Serial No. 558,106

6 Claims. (Cl. 202—49)

This invention relates to improvements in distillation processes in general and in fractionation in particular. Its main object is the fractionation of a distilland without having recourse to the use of a reflux and without necessitating a liquid and vapor phase equilibrium.

Three well known principles are the basis of my invention e. g. Dalton's law of partial pressures, Graham's law of diffusion and the streamline or laminar flow of fluids. According to this latter principle a fluid flowing through a tube can under certain conditions of density and velocity move as if it consisted of thin concentric layers, each layer moving with a constant velocity which increases from the wall of the tube towards its axis.

Let us suppose that an inert gas is flowing through a tube under above said conditions; let us suppose also that a thin annular sheet of distilland is somehow disposed and maintained against the inner wall of said tube. Let us assume also that somehow the exposed surface of said liquid sheet is continuously giving off vapor molecules in a general direction perpendicular to the flowing inert gas. Then these molecules will diffuse into this stream and the depth of their transversal penetration in any given time in the stream will be inversely proportional to the square root of their molecular weight. Hence if the distilland is composed of substances of different molecular weights, the lighter molecules will have a tendency to diffuse deeper in said stream in any given time than the heavier molecules. It is not seen that the fact that the velocity of the flowing gas is greater toward the axis of the tube than in the region close to its wall can in any way affect the rate of diffusion of the vapor molecules in the stream.

If the flowing stream containing diffused vapor molecules is partitioned longitudinally at a certain distance as it leaves the liquid sheet, by let us say another tube positioned concentric and inside the tube containing the distilland, then said inner tube will obviously contain a higher proportion of lighter molecules than there are in the distilland. It is according to this theory that my invention is based.

Referring to the drawings which show one embodiment of my invention:

Figure 2 is a transverse sectional view along line 2—2 of Figure 1.

Figure 3 is a transverse sectional view along line 3—3 of Figure 1.

Figure 4 is another sectional view along lines 4—4 of Figure 1.

Figure 5 illustrates a modification of my apparatus.

Figure 1:
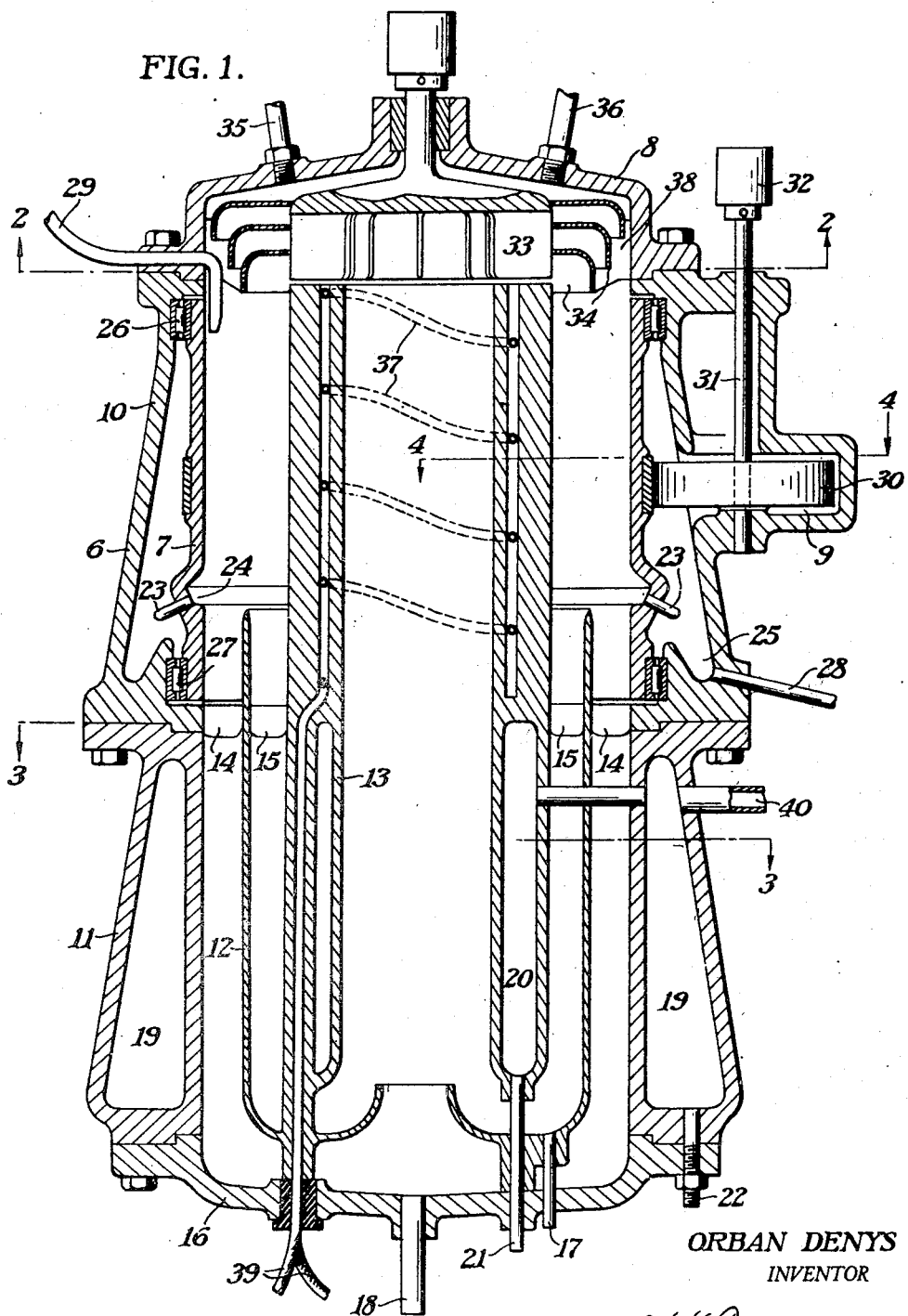
Figure 1 is a vertical sectional view of my apparatus.

In the form shown in the drawings my invention comprises a stationary circulatory system indicated generally at 6; a rotatably mounted vaporization chamber 7 a centrifugal fan 8 and driving means 9 for imparting rotation to the vaporization chamber 7.

This circulatory system is produced by joining together an upper jacket 10, a lower jacket 11, an intermediate tubular member 12 located concentrically to the circulatory system 6 and an innerly disposed tubular member 13 to a fan's casing 8. The lower jacket 11, the tubular members 12 and 13 are joined together by means of webs 14, 15 which are either welded, brazed or soldered to their respective parts. The fan's casing 8 it will be noted is connected directly to the upper jacket 10 by means of screws. An end plate 16 is secured to the lower jacket 11; thus a closed circulatory circuit is constituted.

The intermediate tubular member 12 is bent at its lower end so that it extends slightly innerly and above the lower end of the inner tubular member 13 the bent portion serving as a receptacle for the lighter condensed fraction from which it can be removed by means of outlet pipe located at 17. Another outlet pipe 18 to draw the heavy fraction is located at the center of the end plate 16.

Both the lower jacket 11 and the innerly located tubular member 13 are hollowed at 19 and 20 respectively and are also provided with inlets 21 and 22 through the end plate 16 at the bottom of the circulatory system 6. A horizontally disposed pipe connects the hollow space 20 of the inner tubular member 13 to the hollow space 19 of the lower jacket 11; thus a cooling system is formed. Therefore this lower part of the jacket is called a condenser.

Referring to Figure 1 it will be seen that the vaporization chamber 7 consists of a cylindrical portion and is shaped at its lower end in the form of an annular trough 24. This vaporization chamber is mounted to rotate on upper and lower needle bearings 26 and 27 located within the upper jacket. A plurality of outwardly extending nozzles 23 are removably mounted within annular trough 24 for the purpose of removing residual distilland into a stationary annular trough 25 formed in the lower part of the upper jacket 10. This latter annular trough is in direct communication with the pipe 28 for directing that portion of distilland for further treatment or as desired.

A feed pipe 29 is located in the upper end of the upper jacket 10 and is bent downwardly so that a distilland may be introduced near the upper end of the vaporization chamber 7.

The upper jacket 10 contains also the driving means for rotating the vaporization chamber; these means consist mainly of a friction pulley 30 in close contact with the outer wall of the vaporization chamber, this pulley being secured to shaft 31 and pulley 32. These means are self-explanatory.

Referring to the fan 8, the impeller 33 is more or less of conventional design. The fan's casing has secured at and about at its periphery a series of guide vanes 34 disposed concentrically and which have for purpose to deflect the flow of the circulatory medium by 90° and thus enable gases to circulate efficiently in the circulatory system. These guide vanes are secured together and to the fan's casing by means of web 38. It will be noted too that the fan's casing has means 35 for connecting it to a vacuum pump and similar means 36 to permit the introduction of gases other than those presenting the system if so desired.

An electric heating element 37 in the form of resistance coil is shown more or less conventionally inserted in a longitudinal slot cut in the inner tubular member 13, it will be seen this element is of approximately the same height as the vaporization chamber 7. The details of insulation are not shown. It is shown ta 39 how the lead wires emerge through the end plate 16.

The modification of the heating means shown on Figure 5 consists of a double walled tubular portion closed at its upper end and made of a substance like quartz or glass which is permeable to radiant heat. It acts as a shield for the heating element. Thus the heat rays could heat and vaporize a distilland without substantially heating the circulating medium for gases are also more or less permeable to radiant heat. The use of this shield necessitates the removal of the upper part of the inner tubular member 13 and a slight reduction of its inner and outer diameter so that a seat for that shield is provided.

The general functioning of this apparatus is as follows: gas or gases either introduced in the system by means of inlet 36 or originally present in the circulatory system or emanating from the distilland are made to circulate continuously in the circulatory system by means of the fan. The gas or gases or non-condensable vapors flow from about the periphery of the fan casing towards the lower part of the apparatus where the direction of flow is deflected by about 180° and proceed upwards inside the inner tubular member towards the fan's inlet from where they are blown centrifugally by means of the impeller towards the inner wall of the fan's casing. On reaching this inner wall they are deflected at rightangle by means of the circular concentric guide vanes. It will be appreciated that as the circulating medium flows past the heating element it gets heated; meanwhile a distilland is fed from the feed pipe against the inner wall of the vaporization chamber which is being made to rotate and thus disposed centrifugally in a thin annular liquid sheet against the inner wall. The distilland thus disposed flows downwardly and that portion which has not been vaporized by the action of being swept by the hot gases is evacuated through the pipe 28 protruding from the upper jacket 10.

The function of the hot gases is much more than merely heating the distilland's exposed surface and thereby vaporize it. They serve also as vehicle to transport the distilland's vapors diffused therein to a condenser.

It will be noted that the circulating medium is partitioned by the intermediate tubular member as it flows past the base of the liquid sheet, thus dividing the gas stream into two non mingling portions, and the vapors which have diffused to a greater transversal depth into the circulating gas than these which have penetrated the gas stream to a lesser depth will be condensed separately by means of the condenser, after which both fractions are collected separately through outlet pipes 18 and 17. The circulating medium after having been stripped of the diffused vapors flows back towards the fan's inlet after which it is recirculated. The pressure of the circulating noncondensable gases can be kept constant by removing excess gas by means of the vacuum pump connected to 35.

As pointed out before in order that fractionating can be accomplished along these lines, it is necessary that the flow of the circulating gases be streamline or laminar. This can be achieved if certain conditions are met. Streamline flow formulas are given in Chemical Engineer's Handbook 2nd edition, 1941, pages 818 and 819 (published by McGraw Hill Book Company) which gives a theoretical equation for the streamline flow of gases through tubes of circular cross section: theoretical equation for the weight rate of flow:

$$W = \frac{D^4 N}{128}$$

Since the cross section of my circulatory system is an annulus, the following equation applies:

$$W = \frac{\pi (D_2^2 - D_1^2) N}{128} \left[ D_2^2 + D_1^2 - \frac{D_2^2 - D_1^2}{2.3 \log_{10} (D_2/D_1)} \right]$$

In the above noted formulae $$N \frac{g_c M}{2 R T \mu} \left( \frac{p^2 - p_2^2}{L} \right)$$

$g$ = direction factor 32.1740 (lb. mass) (ft.)/(lb. force) (sec.)$^2$.
L = length of passage, ft.
M = molecular weight.
$p_1 p_2$ = upstream and downstream static pressures lb. force/sq. ft.
R = 1543, the gas constant per mol.
T = absolute temperature °R., i. e., °F. 459.5
W = weight rate of discharge, lb. mass/sec.
$\mu$ = absolute viscosity, lb. mass/(ft.) (sec.).

My process is flexible; for instance by decreasing the pressure of the circulating medium the transversal velocity of diffusion is increased; by increasing this pressure this velocity of the circulating gas, the transversal depth of penetration is decreased, etc. Thus by controlling the pressure of the circulating medium and its velocity I can obtain a transversal depth of penetration of the lighter molecules which would give an optimum concentration of these molecules.

Among the advantages of heating the exposed surface of a distilland I should cite that I believe this mode of heating vaporizes the lighter molecules preferentially to a higher degree than if the vapor molecules had to overcome the hydrostatic pressure of a distilland in order to emerge from its surface as in the conventional way of heating, and that I believe further that an equilibrium between vapor and liquid phase under those circumstances could have a tendency to decrease rather than increase the degree of separation.

If radiant heat is used to vaporize the distilland it is suggested that the absorptivity of a distilland to radiant heat can under certain circumstances be increased by mixing with it some substance of high absorptivity to radiant heat like amorphous carbon for instance.

If radiant heat is used to vaporize the distilland, the heating elements sheet is liable to be at a temperature so high that it would be detrimental to the distillate should the vapors molecules impinge against it notwithstanding the cooling effect of the circulating gas, however, this condition will apparently not occur if the pressure and velocity of the circulating gas are controlled so that the diffused vapor molecules at the point of their maximum transversal penetration in the gas stream do not reach the shield.

The circulating gas can be under any practical pressure. The lowest practical pressure would be limited only by the fan's ability to propel gases at that pressure. It is logical to assume that a fan will move gases as long as the smallest transverse dimension of the passages through which gases flow in the fan's structure is substantially greater than the mean free path of the molecules of the gases the fan blades are acting upon. Therefore pressures in the neighborhood of $1/100$ of 1 m./m. seem to be practical. Any view to the contrary is apparently contrary to the kinetic theory.

This process although applicable to any distilling material is mostly suitable to such material where a high vacuum is indicated. My process is also adaptable to the fractionating of gases which can be made to diffuse into a gas stream. The process would be substantially the same as that described for distillands. The difference would consist in substituting for the rotating vaporization chamber a porous substance through which the gases to be fractionated issue. According to this procedure isotopes of substances could be concentrated.

The term "non-condensable gas" wherever employed in the specification and claims refers to a gas or mixture of gases which do not condense at the pressure and temperature employed.

It is to be understood that the above description of my invention is given by way of illustration only and that the process and apparatus may be modified to a considerable extent and still come within the scope of the appended claims.

This application is a continuation in part of my abandoned application 419,777, filed November 9, 1941.

What I claim is:

1. A fractionating process comprising maintaining a sheet of vaporizing distilland against the inner wall of a tubular member of circular cross section; simultaneously passing a stream of inert gases over the exposed surface of said sheet to effect the diffusion of the distilland vapor molecules into said stream; the velocity of said stream being such as to result in a streamline or laminar flow, this velocity being also such that the deepest transversal penetration of the diffused vapor molecules in said stream at the point where said stream leaves the liquid sheet of distilland is less than its deepest possible transversal penetration; simultaneously partitioning said stream at the base of the liquid sheet at a substantial transversal distance from said sheet, this distance being also substantially less than the transversal distance from the liquid sheet to the point of the deepest possible penetration of the diffused vapor molecules and condensing separately the vapors contained in this thus divided stream.

2. In distillation processes comprising the circulation of non-condensable gases over the exposed surface of a liquid sheet distilland, the diffusion of the distilland's vapor into said non-condensable gases and their entrainment toward a condenser; the improvement comprising regulating the velocity of the non-condensable gases so that they have streamline or laminar flow and also so that the deepest transversal penetration of the diffusing molecules in said non-condensable gases at the point where said non-condensable gases leave the liquid sheet of distilland will be less than its deepest possible penetration simultaneously partitioning said flowing non-condensable gases at the base of the liquid sheet of distilland and at a substantial transversal distance from said sheet, this distance being also substantially less than the transversal distance from the liquid sheet to the point of the deepest possible penetration of the diffused vapor molecules and condensing separately the vapors contained in this thus divided stream.

3. A fractionating process comprising passing a stream of a hot inert gas in streamline flow over the exposed surface of a heated vaporizing distilland, which surface is substantially parallel to the axis of said flow, to effect the diffusion of the vaporizing distilland into said gas, dividing said flowing stream containing said vaporized distilland into a plurality of separate streams including two separate streams each containing a different fraction of said vaporized distilland, and separately condensing distilland vapors out of at least one of said separate streams.

4. A distillation process which comprises in combination forming distilland into a thin film, heating the film of distilland to distillation temperature, passing a stream of gas which is flowing in a laminar or streamline flow into contact with the film of distilland so that the stream of gas passes in a direction approximately parallel with the surface of the film, partitioning the stream of gas after it has passed over the film so that layers thereof which were at different distances from the film of distilland are segregated and separately condensing the vapors contained in the partitioned layers of gases.

5. A process of high vacuum distillation which comprises in combination introducing distilland onto a rotating surface upon which it is distributed in a thin film by centrifugal force, which surface is maintained under a high vacuum, heating the film of distilland thus formed to distillation temperature, passing a stream of gas which is flowing in a laminar or streamline flow into contact with the film of distilland so that the stream of gas passes in a direction approximately parallel with the surface of the film, partitioning the stream of gas after it has passed over the film so that layers thereof which were at different distances from the film of distilland are segregated and separately condensing the vapors contained in the partitioned layers of gases.

6. A distillation process which comprises in combination mechanically forming distilland into a thin film, heating the film of distilland thus formed to distillation temperature, passing a stream of gas which is flowing in a laminar or streamline flow into contact with the film of distilland so that the stream of gas passes in a direction approximately parallel with the surface of the film, partitioning the stream of gas after it has passed over the film so that layers thereof which were at different distances from the film of distilland are segregated and separately condensing the vapors contained in the partitioned layers of gases.

ORBAN DENYS.

REFERENCES CITED

The following references are of record in the file of this patent:

UNITED STATES PATENTS

| Number | Name | Date |
| --- | --- | --- |
| 2,018,049 | Allen | Oct. 22, 1935 |
| 1,419,008 | Baum | June 2, 1922 |
| 1,881,041 | Benjamin | Oct. 4, 1942 |
| 2,343,666 | Hickman | Mar. 7, 1944 |
| 2,255,069 | Maier | Sept. 9, 1941 |
| 1,881,490 | Grmelin | Oct. 11, 1932 |
| 1,486,521 | Hertz | Mar. 11, 1924 |

FOREIGN PATENTS

| Number | Country | Date |
| --- | --- | --- |
| 270,286 | Great Britain | Apr. 23, 1927 |